(12) United States Patent
Hamada

(10) Patent No.: US 10,174,474 B2
(45) Date of Patent: Jan. 8, 2019

(54) MOVABLE TSUNAMI BUFFER DAM

(71) Applicant: Eigai Hamada, Fujisawa (JP)

(72) Inventor: Eigai Hamada, Fujisawa (JP)

( * ) Notice: Subject to any disclaimer, the term of this patent is extended or adjusted under 35 U.S.C. 154(b) by 0 days.

(21) Appl. No.: 15/614,406

(22) Filed: Jun. 5, 2017

(65) Prior Publication Data
US 2017/0350082 A1    Dec. 7, 2017

(30) Foreign Application Priority Data

Jun. 6, 2016    (JP) .................................. 2016-112326

(51) Int. Cl.
| | | |
|---|---|---|
| *E02B 7/24* | (2006.01) | |
| *E02B 3/10* | (2006.01) | |
| *E02B 7/20* | (2006.01) | |
| *E02B 3/06* | (2006.01) | |
| *E02B 7/22* | (2006.01) | |

(Continued)

(52) U.S. Cl.
CPC ................ *E02B 3/06* (2013.01); *E02B 3/062* (2013.01); *E02B 3/104* (2013.01); *E02B 3/106* (2013.01); *E02B 7/22* (2013.01); *E02B 7/40* (2013.01); *E02B 7/50* (2013.01); *E06B 2009/007* (2013.01)

(58) Field of Classification Search
CPC ................ E02B 7/24; E02B 7/56; E02B 3/104
USPC ........ 405/114, 115, 87–111; 52/101, 169.11, 52/169.14, 2.21, 2.23, 741.1, 741.3, 52/741.4, 5
See application file for complete search history.

(56) References Cited

U.S. PATENT DOCUMENTS

| | | | | |
|---|---|---|---|---|
| 5,988,946 A | * | 11/1999 | Reed ....................... | E02B 3/102 |
| | | | | 405/114 |
| 5,993,113 A | * | 11/1999 | Darling ................... | E02B 3/108 |
| | | | | 405/114 |

(Continued)

FOREIGN PATENT DOCUMENTS

| | | |
|---|---|---|
| JP | 2012-057401 A | 3/2012 |
| JP | 2012-241449 A | 12/2012 |

(Continued)

*Primary Examiner* — Benjamin F Fiorello
*Assistant Examiner* — Edwin J Toledo-Duran
(74) *Attorney, Agent, or Firm* — McGinn I.P. Law Group, PLLC

(57) ABSTRACT

A movable tsunami buffer dam has a unit configured such that a plurality of separate units, each of which having a shape in which a frame made of a light material is sandwiched by a pair of plates made of a light material, is stacked with said plates disposed in a pile; and a locking member for locking said unit to a ground surface such that said unit can rise up from said ground surface and collapse onto said ground surface. The separate units has a structure in which water from a tsunami can advance into a space formed between said plates by said frame.

A required thickness is ensured due to said unit being configured such that said separate units are stacked, and the manufacturing cost is reduced to a greater extent than in the case of a dam configured from a single separate unit of said required thickness, because the big size lumber for obtaining the units is very expensive. The unit is installed in a state of being collapsed on said ground surface at normal times, and when a tsunami arrives, said unit rising up due to the force of the tsunami and the buoyancy of the seawater, resisting the passage of the tsunami and reducing the power of the tsunami.

13 Claims, 10 Drawing Sheets

(51) Int. Cl.
   *E02B 7/40*   (2006.01)
   *E06B 9/00*   (2006.01)
   *E02B 7/50*   (2006.01)

(56) References Cited

U.S. PATENT DOCUMENTS

| | | | | |
|---|---|---|---|---|
| 6,029,405 | A * | 2/2000 | Wood | E04H 3/14 |
| | | | | 52/2.23 |
| 6,216,399 | B1 * | 4/2001 | Belarbi | E02B 3/104 |
| | | | | 52/169.14 |
| 6,450,733 | B1 * | 9/2002 | Krill | E02B 3/102 |
| | | | | 405/107 |
| 6,554,534 | B1 * | 4/2003 | Butterfield | E02B 15/08 |
| | | | | 405/63 |
| 6,623,209 | B1 * | 9/2003 | Waters, Jr. | E02B 3/104 |
| | | | | 405/100 |
| 7,690,865 | B1 * | 4/2010 | Stewart | E02B 3/108 |
| | | | | 405/115 |
| 7,972,081 | B2 * | 7/2011 | Linares | E02B 3/104 |
| | | | | 405/105 |
| 9,267,254 | B2 * | 2/2016 | Gujer | E02B 3/104 |
| 9,453,315 | B2 * | 9/2016 | Roy | E02B 3/104 |
| 2015/0117952 | A1 * | 4/2015 | Gujer | E02B 3/104 |
| | | | | 405/96 |
| 2017/0356149 | A1 * | 12/2017 | Adler | E02B 3/102 |

FOREIGN PATENT DOCUMENTS

| | | |
|---|---|---|
| JP | 5207091 B | 6/2013 |
| JP | 5329452 B | 10/2013 |
| JP | 5559950 B | 7/2014 |
| JP | 5683056 B | 3/2015 |

* cited by examiner

FIG. 6
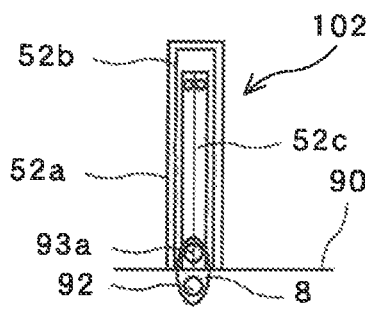
(a)
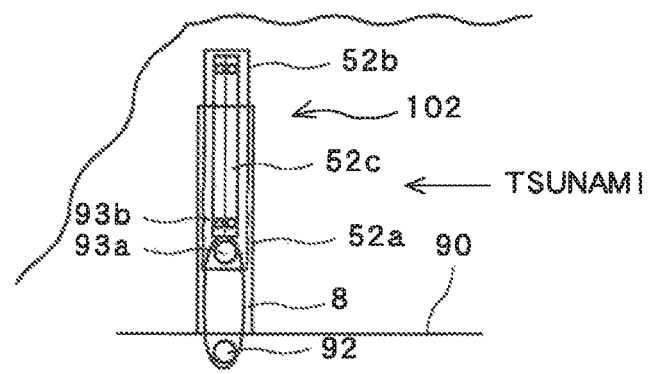
(b)
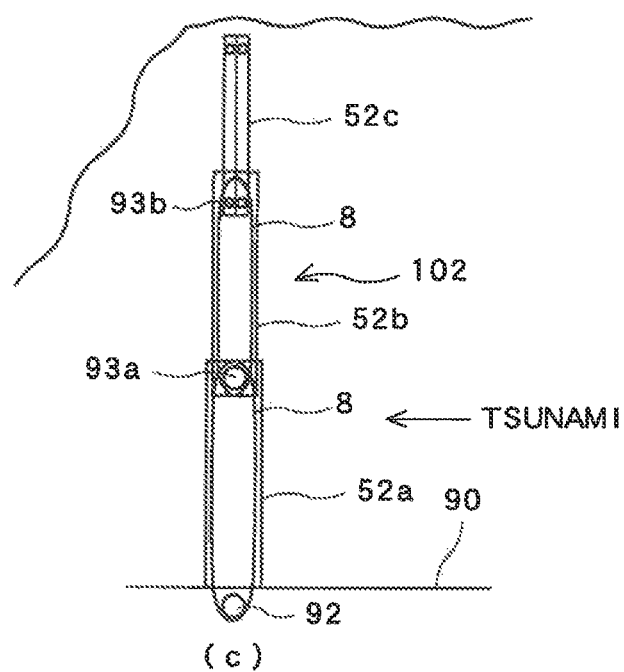
(c)

(a)

(b)

(c)

MOVABLE TSUNAMI BUFFER DAM

BACKGROUND OF THE INVENTION

Field of the Invention

The present invention relates to a movable tsunami buffer dam such as a breakwater that is installed in order to minimize damage due to flooding, etc., caused by waves from the ocean such as a tsunami or a high wave.

Description of the Related Art

Breakwaters for defending against tsunamis the prior art (Japanese Patent No. 5329452, Japanese Patent Application Kokai Publication No. 2012-57401, Japanese Patent Application Kokai Publication No. 2012-241449) are commonly fixed structures in which rebar-containing concrete, etc., is used. Such breakwaters are large in scale, and material and construction costs therefor are high. Movable tsunami buffer dams in the prior art have complex structures and require complex operations due to the installation of air chambers, etc. Therefore, such dams have high material and construction costs and are less reliable.

Additionally, the prior art includes inventions (Japanese Patent No. 5207091, Japanese Patent No. 5683056, Japanese Patent No. 5559950) filed by the inventor. In these inventions, one end of a structure made of a light material acts as a fixed element, and when seawater advances during flooding, the other end of the structure rises automatically due to buoyancy and acts as a breakwater. The above-described prior art, however, has problems in terms of strength, and therefore has a problem in that there are limitations on the locations where the prior art can be applied.

SUMMARY OF THE INVENTION

An object of the present invention is to provide a movable tsunami buffer dam of which the strength can be improved at low cost, which can smoothly reduce the force of a tsunami that strikes in a complex manner, and which can effectively operate as a movable buffer dam.

A movable tsunami buffer dam according to a first aspect of the present invention comprises:

a unit configured such that a plurality of separate units, each of which having a shape in which a frame made of a light material is sandwiched by a pair of plates made of a light material, is stacked with said plates disposed in a pile; and a locking member for locking said unit to a ground surface such that said unit can rise up from said ground surface and collapse onto said ground surface;

said separate units having a structure in which water from a tsunami can advance into a space formed between said plates by said frame;

a required thickness being ensured due to said unit being configured such that said separate units are stacked, and the manufacturing cost being reduced to a greater extent than in the case of a dam configured from a single separate unit of said required thickness; and said unit being installed in a state of being collapsed on said ground surface at normal times, and when a tsunami arrives, said unit rising up automatically due to the force of the tsunami and the buoyancy of the seawater, resisting the passage of the tsunami and reducing the power of the tsunami.

This movable tsunami buffer dam is configured such that a structure that is constructed by sandwiching a frame made of a light material between plates made of a light material and that is shaped in the manner of a door is produced as a separate unit, a plurality of such units being installed in a line along a ground surface or wall surface, the movable tsunami buffer dam fulfilling the purpose of reducing the power of a tsunami due to the structure using the force of the waves and buoyancy when submerged to rise up, water being taken into the interior of the structure, and the taken-in water being raised together with the structure by the tsunami, and the movable tsunami buffer dam furthermore fulfilling the purpose of reducing the power of a tsunami by suppressing flooding from the tsunami by an amount proportionate to the height to which the movable tsunami buffer dam rises, wherein by adopting a multilayered structure for the structure of each of the units, the strength of the structure is increased, a greater amount of water is taken into the structure to enhance the tsunami-reduction effect, and inexpensive materials can be employed, thus also achieving a reduction in cost.

A movable tsunami buffer dam according to a second aspect of the present invention comprises:

a plurality of units configured such that a plurality of separate units, each of which having a shape in which a frame made of a light material is sandwiched by a pair of plates made of a light material, is stacked with said plates disposed in a pile; and a locking member for locking said plurality of units to each other to link said units into a chain, and locking the unit on the lowermost level to a ground surface, such that said plurality of units can rise up automatically from said ground surface and collapse onto said ground surface;

said separate units having a structure in which water from a tsunami can advance into a space formed between said plates by said frame;

a required thickness being ensured due to said units being configured such that said separate units are stacked, and the manufacturing cost being reduced to a greater extent than in the case of a dam configured from a single separate unit of said required thickness; and said plurality of units being installed in a state of being folded on said ground surface at normal times, and when a tsunami arrives, said plurality of units rising up so as to form multiple levels due to the force of the tsunami and the buoyancy of the seawater, and said multilevel units resisting the passage of the tsunami and reducing the power of the tsunami.

This movable tsunami buffer dam is configured such that, in a mechanism in which unit structures that are constructed by sandwiching a frame made of a light material between plates made of a light material and that are shaped in the manner of a door are installed along a ground surface or wall surface, the mechanism fulfilling the purpose of mitigating the power of a tsunami due to the structures using the force of the waves and buoyancy when submerged to rise up, the structures are manufactured in multiple levels in the form of a folding screen, whereby the movable tsunami buffer dam reduces the power of a tsunami due to water from the advancing tsunami being taken into the structures in a greater amount proportionate to the number of levels of the multilevel structures and the taken-in water being raised together with the structures up to the tsunami, and furthermore it becomes possible to deal with tsunamis of greater height according to the number of levels in the multilevel structures, and the movement of subsequent tsunamis is restricted, whereby the movable tsunami buffer dam further reduces the power of a tsunami, wherein by adopting a multilayered structure for the structure of each of the units, the strength of the structure is increased, a greater amount of water is taken into the structure to enhance the tsunami-reduction effect, and inexpensive materials can be employed, thus also achieving a reduction in cost.

A movable tsunami buffer dam according to a third aspect of the present invention comprises:

a unit forming a wave-blocking gate, said unit being configured such that a plurality of separate units, each of which having a shape in which a frame made of a light material sandwiched by a pair of plates made of a light material, is stacked with said plates disposed in a pile;

a wave-blocking-gate shaft column that is rotatably attached to the rear surface of said unit and that is provided upright to the bottom surface of a river, said wave-blocking-gate shaft column supporting said unit such that said unit can open and close as a wave-blocking gate for holding back said river and can rotate perpendicular to said river bottom surface;

an open stopper abutting the distal end part of said unit, and opening a gap between said distal end part of said unit and a riverbank or pier; and a close stopper against which said unit abuts when said unit rotates to a position for closing as a wave-blocking gate, said close stopper preventing said unit from rotating further;

said separate units having a structure in which water from a tsunami can advance into a space formed between said plates by said frame;

a required thickness being ensured due to said unit being configured such that said separate units are stacked, and the manufacturing cost being reduced to a greater extent than in the case of a dam configured from a single separate unit of said required thickness; and said unit abutting said open stopper due to the flow of said river at normal times, and when a tsunami arrives, said unit rotating automatically and abutting said close stopper, resisting the passage of the tsunami and reducing the power of the tsunami.

This movable tsunami buffer dam is configured such that a structure that is constructed by sandwiching a frame made of a light material between plates made of a light material and that is shaped in the manner of a gate is installed so as to stand vertically in water, and also is configured such that: the movable tsunami buffer dam is installed so that an opening part expands to receive waves incoming from the ocean side; the structure uses the force of a large water mass from a tsunami, etc., moving from the ocean side toward the land side to automatically expand about a shaft column in a direction perpendicular to the flow of the tsunami, and functions as a dam submerged in the flood waters of the tsunami at a position at which the structure is perpendicular to the flow of the tsunami; the movable tsunami buffer dam fulfills the purpose of mitigating the power of a tsunami by holding back subsequent surging tsunamis; the structure has a space in the interior thereof and increases in weight upon taking in flood waters to the space; and the movable tsunami buffer dam reduces the power of a tsunami due to the taken-in water being moved together with the structure up to the tsunami, and furthermore the interior space is filled with flood water and can thereby be made use of to increase the overall strength of the structure, wherein by adopting a multilayered structure for the structure of each of the units, the strength of the structure is increased, a greater amount of water is taken into the structure to enhance the tsunami-reduction effect, and inexpensive materials can be employed, thus also achieving a reduction in cost.

A movable tsunami buffer dam according to a fourth aspect of the present invention comprises:

a plurality of units, each of which having a shape in which a frame made of a light material is sandwiched by a pair of plates made of a light material;

a wave-blocking wall provided upright to a ground surface; and a locking member for locking said plurality of units to each other to link said units into a chain, and locking the unit on the lowermost level to said ground surface, such that said plurality of units can rise up from said ground surface and collapse onto said ground surface;

said units having a structure in which water from a tsunami can advance into a space formed between said plates by said frame; and said plurality of units being installed in a state of being folded on said ground surface at normal times, and when a tsunami arrives, said plurality of units rising up automatically so as to form multiple levels due to the force of the tsunami and the buoyancy of the seawater, said multilevel units that have risen up and said wave-blocking wall resisting the passage of the tsunami and reducing the power of the tsunami.

This movable tsunami buffer dam is configured such that, in a mechanism in which unit structures that are constructed by sandwiching a frame made of a light material between plates made of a light material and that are shaped in the manner of a door are installed along a ground surface or wall surface, the mechanism fulfilling the purpose of mitigating the power of a tsunami due to the structures using the force of the waves and buoyancy when submerged to rise up, the structures are manufactured in multiple levels in the form of a folding screen, whereby it becomes possible to deal with tsunamis of greater height according to the number of levels in the multilevel structures, and the movement of subsequent tsunamis is restricted by an amount proportionate to said height at the same time that water from the advancing tsunami is taken into the structure and the taken-in water is raised together with the structure up to the tsunami, whereby the movable tsunami buffer dam reduces the power of a tsunami, wherein a fixed wave-blocking wall is installed on the land side of the ground surface to which the multilevel structures are attached, whereby the height of the wave-blocking wall further increases the tsunami height that can be dealt with at the same time that the multilevel structures are partially housed and protected.

A movable tsunami buffer dam according to a fifth aspect of the present invention comprises:

a plurality of units, each of which having a shape in which a frame made of a light material is sandwiched by a pair of plates made of a light material;

a wave-blocking wall provided upright to a ground surface;

a locking member for locking said plurality of units to each other to link said units into a chain, and locking the unit on the lowermost level to said wave-blocking wall, such that said plurality of units can rise up from said ground surface and collapse onto said ground surface;

a ring for a guide wire, said ring being provided to a side surface of the unit forming the uppermost level when said plurality of units rises up;

a support column provided upright to the rear of said wave-blocking wall; and a guide wire of which one end is secured to said support column and of which the other end is passed through said ring for a guide wire;

said units having a structure in which water from a tsunami can advance into a space formed between said plates by said frame;

said plurality of units being installed in a state of being folded on said ground surface at normal times; and when a tsunami arrives, said plurality of units rising up so as to form multiple levels due to the force of the tsunami and the buoyancy of the seawater, and in a state in which the movement of the unit on the uppermost level is constrained by said guide wire, said multilevel units that have risen up automatically and said wave-blocking wall resisting the passage of the tsunami and reducing the power of the tsunami.

This movable tsunami buffer dam is configured such that, in a mechanism in which unit structures that are constructed by sandwiching a frame made of a light material between plates made of a light material and that are shaped in the manner of a door are installed along a ground surface or wall surface, the mechanism fulfilling the purpose of mitigating the power of a tsunami due to the structures using the force of the waves and buoyancy when submerged to rise up, the structures are manufactured in multiple levels in the form of a folding screen, whereby it becomes possible to deal with tsunamis of greater height according to the number of levels in the multilevel structures, and the movement of subsequent tsunamis is restricted by an amount proportionate to said height at the same time that water from the advancing tsunami is taken into the structure and the taken-in water is raised together with the structure up to the tsunami, whereby the movable tsunami buffer dam reduces the power of a tsunami, wherein a guide wire is installed that links the ocean-side site of the installation position of the multilevel tsunami buffer dam to the distal end of an auxiliary support column installed on the land side, the guide wire passing through a ring installed on the distal end part of the structure and being operated such that the multilevel tsunami buffer dam appropriately expands in response to a high tsunami, thereby reinforcing the tsunami reduction effect.

A movable tsunami buffer dam according to a sixth aspect of the present invention comprises:

a plurality of units, each of which having a shape in which a frame made of a light material is sandwiched by a pair of plates made of a light material;

a wave-blocking wall provided upright to a ground surface;

a locking member for locking said plurality of units to each other to link said units into a chain, and locking the unit on the lowermost level to said wave-blocking wall, such that said plurality of units can rise up from said ground surface and collapse onto said ground surface; and recessed sections by which said wave-blocking wall and the locking-member-side end parts of said units are locked;

said units having a structure in which water from a tsunami can advance into a space formed between said plates by said frame;

said plurality of units being installed in a state of being folded on said ground surface at normal times, and when a tsunami arrives, said plurality of units rising up so as to form multiple levels due to the force of the tsunami and the buoyancy of the seawater;

in the risen-up state, adjacent recessed sections being fitted into each other to prevent contiguous units from rotating in one direction relative to each other; and said multilevel units that have risen up and said wave-blocking wall resisting the passage of the tsunami and reducing the power of the tsunami.

This movable tsunami buffer dam is configured such that, in a mechanism in which unit structures that are constructed by sandwiching a frame made of a light material between plates made of a light material and that are shaped in the manner of a door are installed along a ground surface or wall surface, the mechanism fulfilling the purpose of mitigating the power of a tsunami due to the structures using the force of the waves and buoyancy when submerged to rise up, the structures are manufactured in multiple levels in the form of a folding screen, whereby it becomes possible to deal with tsunamis of greater height according to the number of levels in the multilevel structures, and the movement of subsequent tsunamis is restricted by an amount proportionate to said height at the same time that water from the advancing tsunami is taken into the structure and the taken-in water is raised together with the structure up to the tsunami, whereby the movable multilevel tsunami buffer dam reduces the power of a tsunami, wherein a scheme for establishing recesses and projections on the surfaces where the multilevel structures contact each other during operation is implemented, thereby preventing a situation in which the structures at each level fold when the tsunami recedes and then fail to expand during the next tsunami flooding.

In accordance with the present invention, strength can be improved at low cost, and the force of a tsunami that strikes in a complex manner can be smoothly reduced. Additionally, the movable tsunami buffer dam of the present invention has high strength and exceptional durability, and can effectively and automatically operate as a movable buffer dam (including a gate) when necessary.

BRIEF DESCRIPTION OF THE DRAWINGS

FIG. 6 is a diagram showing a movable tsunami buffer dam 102 according to a third embodiment of the present invention;

DESCRIPTION OF THE PREFERRED EMBODIMENTS

Figure 1:
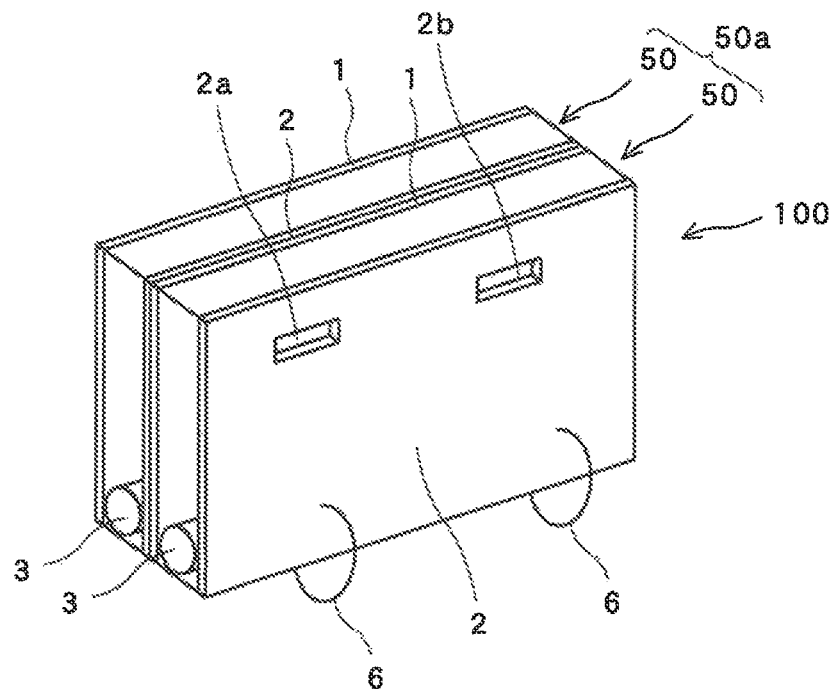
FIG. 1 is a perspective view of a unit 50a of a movable tsunami buffer dam 100 according to a first embodiment of the present invention.
Figure 2:
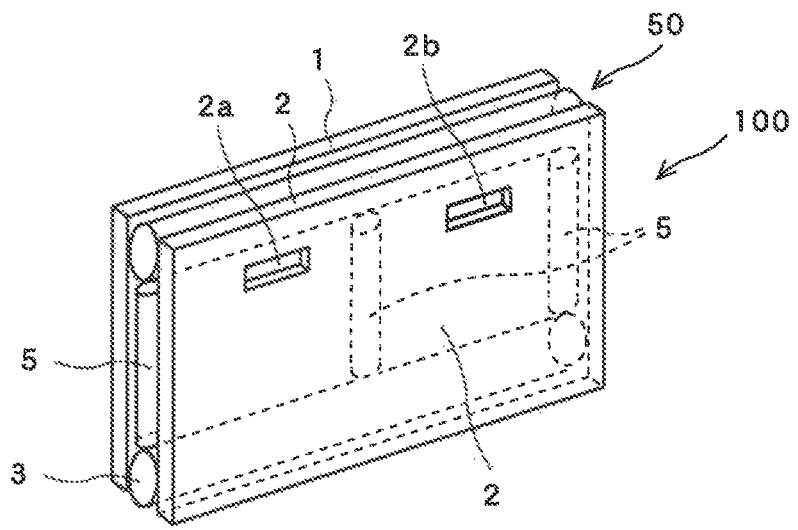
FIG. 2 is a perspective view of a separate unit 50 of the same.

The embodiments of the present invention are described below. FIG. 1 is a perspective view of a multilayered movable tsunami buffer dam 100 according to a first embodiment of the present invention. FIG. 2 is a perspective view of a separate unit 50 constituting a part of the movable tsunami buffer dam 100. As shown in FIG. 1, the movable tsunami buffer dam 100 of the present embodiment is configured from a unit 50a in which the separate units 50 are stacked. The separate unit 50 is a structure that is shaped in the manner of a door constructed by sandwiching a frame made of a light material between plates made of a light material. In the dam 100, a plurality of separate units 50 that are produced separately is lined up and installed along a ground surface or wall surface. The structure of each of the separate units 50 uses the force of the waves and buoyancy when submerged to rise up, water being taken into the interior of the structure, and the structures suppress most of the motion of the tsunami up to the height of the dam, fulfilling the purpose of mitigating the power of the tsunami.

As shown in FIG. 2, a float horizontal column 4, a shaft horizontal column 3, and a vertical column 5 are sandwiched by a land plate 1 disposed on the land side and an ocean plate 2 disposed on the ocean side, the separate unit 50 being assembled by securing the float horizontal column 4, shaft horizontal column 3, and vertical column 5 and the land plate 1 and ocean plate 2. The columns and plates can be secured by screws, adhesives, etc. The land plate 1, ocean plate 2, float horizontal column 4, shaft horizontal column 3, and vertical column 5 are manufactured from wood or another light material. The land plate 1 is a strong, airtight plate disposed on the land side. The ocean plate 2 is disposed on the ocean side. Three vertical columns 5 are secured, between the ocean plate 2 and the land plate 1, at the center part and the two horizontal-direction end parts thereof. The float horizontal column 4, shaft horizontal column 3, and vertical columns 5 are secured between the ocean plate 2 and the land plate 1 such that the float horizontal column 4 and the shaft horizontal column 3 are secured at the upper-end part and the lower-end part, respectively, along the vertical direction of the plates. A space (cavity) for taking in water is formed between the land plate 1 and ocean plate 2 by the vertical columns 5, float horizontal column 4, and shaft horizontal column 3. Opening parts 2a, 2b for taking in surging water are formed in the ocean plate 2 at positions that are on the upper section when the ocean plate 2 rises up.

The shaft horizontal column 3 forms an installation-surface side when the separate unit 50 is floating. When the buffer dam 100 is configured such that two separate units 50 are stacked, as shown in FIG. 1, the two shaft horizontal columns 3 are brought together and are locked by being surrounded by a ring-shaped wire 6, the wire 6 being secured to the ground surface of the land and the two separate units 50 being rotatably installed on the ground surface. It is preferable that a plurality (two or more) of wires 6 is installed. The wire 6 may be of any configuration, provided that the wire 6 functions similarly to a hinge for the separate units 50 and that, in a state in which the shaft horizontal columns 3 are locked to the ground upper surface, the separate units 50 can rotate.

The float horizontal column 4 floats on water when the dam 100 is floating, and prevents sand and debris from advancing into the gap between the land plate 1 and the ocean plate 2 at normal times. The vertical columns 5 move in a perpendicular direction and stand upright when the dam 100 is floating, and also function as reinforcing members for raising the strength of the land plate 1 and the ocean plate 2. The ring-shaped wire 6 is a member for coupling the shaft horizontal column and an installation surface, and is secured to the installation surface by a post, etc. The dam 100 is provided with the necessary strength so as not to be shifted or dislocated when water advances into the dam 100. The wire 6 is, e.g., a thick wire wound around the shaft horizontal column 3, the wire 6 being a structure for locking the shaft horizontal column 3 such that the shaft horizontal column 3 can revolve about the axis thereof.

Figure 4:
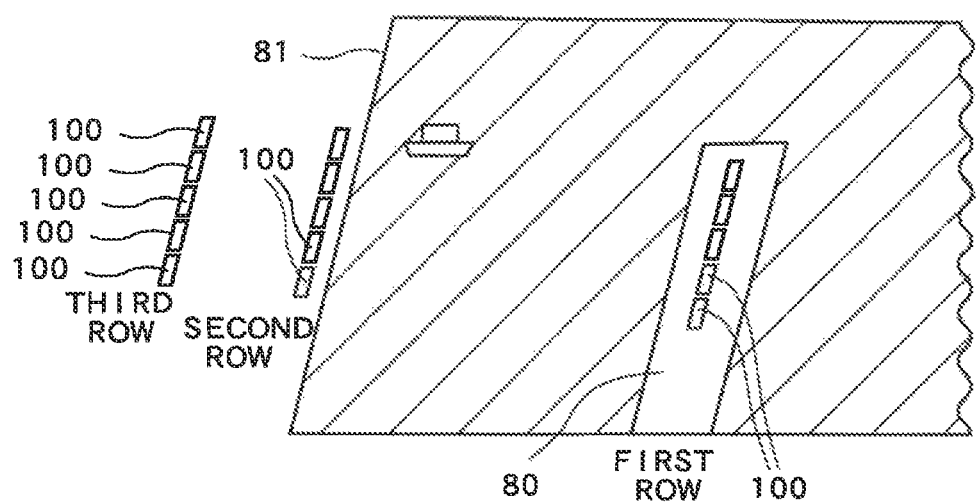
FIG. 4 is a plan view of a breakwater on which the movable tsunami buffer dam 100 of the first embodiment is installed.

The unit 50a of the dam 100 is constructed from plates and a frame that are made of a light material. Therefore, in cases where the shaft horizontal column 3 of the frame of the unit 50a is locked to the installation surface by the wire 6, when a tsunami arrives, the unit 50a functions as a breakwater in the manner of a door in which the unit 50a itself is attached to the installation surface, the unit 50a rising up in accordance with the water level, while weakening the power of the tsunami, due to the force of the waves and the buoyancy of the water. Because the dam 100 is of such size as to be easy to handle and to easily retain strength, it would be difficult for the dam 100 to fulfill the purpose of a breakwater along an entire shoreline using a single substantial structure. Thus, in order to fulfill the function of a substantial breakwater along an entire shoreline, a plurality of dams 100 are disposed in a line at appropriate intervals parallel to the desired shoreline, as shown in FIG. 4.

A space is provided in the interior of the unit 50a, water from a tsunami being taken into the space to increase the strength and weight of the structure. The combined weight of the structure and the taken-in water is caused to carry out the work of rising up to the tsunami, thus weakening the power of the tsunami.

Figure 3:
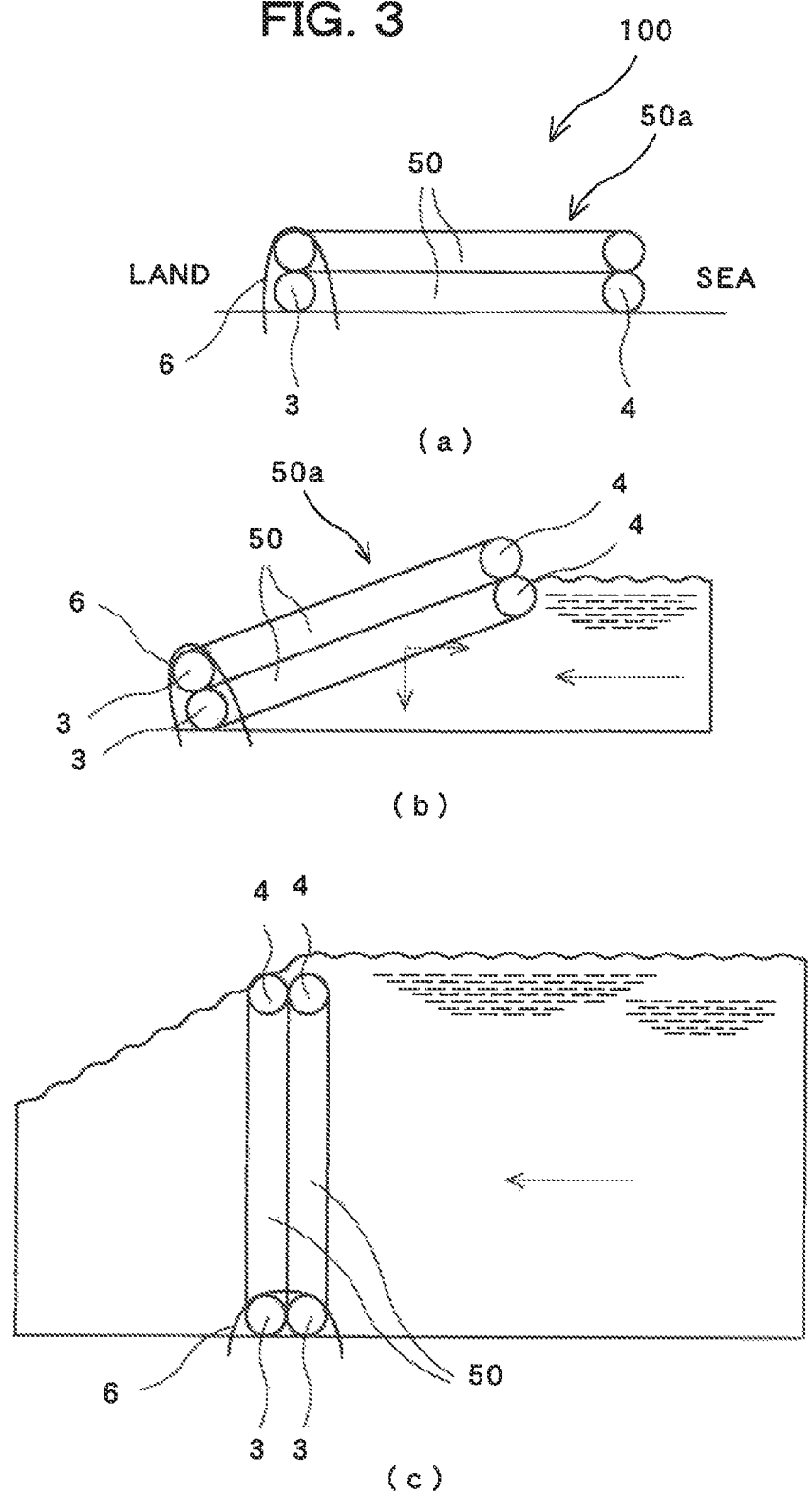
FIG. 3 is a diagram showing the operation of the first embodiment.

The operation of the present embodiment is described next. At normal times when there are no tsunamis, as shown in FIG. 3(a), the unit 50a or dam 100 is laid on the ground surface of the land so that the float horizontal column 4 is on the ocean side and the shaft horizontal column 3 is on the land side. In cases where a tsunami having a low water level has arrived, as shown in FIG. 3(b), the float horizontal column 4 of each of the units 50a of the dam 100 floats on the water, whereby the dam 100 inclines such that the float horizontal column 4 is oriented upward during flooding, and the dam 100 rises up. Afterward, when a high-water-level tsunami arrives, as shown in FIG. 3(c), the unit 50a as a structure configured from the land plate 1 and the ocean plate 2 stands and remains substantially upright.

At this time, in order to maintain an orientation in which the wave-blocking door comprising the unit 50a is in a position so as to be standing upright and substantially perpendicular to the ground surface, a support column, etc., may be installed to the rear (land side) of the unit 50a so that the unit 50a does not collapse on the land side due to the force of the tsunami. A degree of freedom may be imparted to the relationship between the support column and the unit 50a such that the unit 50a may lean more or less toward the land side to offset the power of the tsunami. This allows part of the tsunami to advance beyond the breakwater toward the land, but also makes it possible to suppress most of the motion of subsequent tsunamis up to the height of the dam 100 in accordance with the height of the flooding, therefore making it possible to anticipate a corresponding effect. Accordingly, any configuration may be adopted, provided that the unit 50a or dam 100 can maintain sufficient strength to prevent the passage of subsequent tsunamis while in an upright state in the water.

There are also cases where the dam 100 is ineffective against large-scale tsunamis when merely installed in a single line along a shore. In such cases, a plurality of dams 100 in a first row is installed on a breakwater 80 installed in the ocean, a plurality of dams 100 in a second row is installed along a shore or quay 81, and a plurality of dams 100 in a third row is installed on the land slightly set away from the shore or quay 81, as shown in FIG. 4. Because the dams 100 in the first row are distant from residential areas, they are inconspicuous and do not pose a hindrance; therefore, these dams 100 can be installed so as to have a relatively large size, such as a height of 2-3 m.

In this case, when the plurality of dams 100 is installed in close contact with each other along the shore or quay 81, most of the force of a tsunami is received by the dams 100. Specifically, there are two alternatives: the tsunami either is held back by the plurality of dams 100, or crests the dams 100 and advances toward the land. In this case, the force of a tsunami that is held back by the dams 100 is applied directly to the dams 100. Even if the separate units 50 are stacked, however, they are manufactured from wood or another light material; therefore, it is impossible to impart the separate units 50 with enough strength to completely hold back a strong tsunami. Thus, a gap is provided between the dams 100, as shown in FIG. 4. The tsunami thereby passes through the gap between the dams 100 and moves beyond the dams 100 toward the land. The volume of the tsunami that is held back by the dams 100 is accordingly reduced, part of the tsunami being held back by the dams 100 and the remaining part passing between the dams 100. This reduces the degree to which the energy of the tsunami is applied to the plurality of dams 100 to a greater extent than when the dams 100 are densely disposed, and eliminates the risk that the separate units 50, which are constructed from a light material, will be destroyed by the tsunami. At this time, the water level on the land side of the dams 100 is equal to the water level on the ocean side at a relatively earlier time.

In the present embodiment, the dam 100 is configured such that two or more of the separate units 50 shown in FIG. 2 are disposed in a pile, as shown in FIG. 1. This increases the strength of the dam 100 to a greater extent than when the unit 50a comprises a single layer (separate unit 50). This is because the thickness of the unit for reducing the power of the tsunami is increased. In this case, a strategy for increasing the size of the transverse surfaces of the float horizontal column 4, the shaft horizontal column 3, and the vertical column 5 between the land plate 1 and the ocean plate 2 to enlarge the gap between the land plate 1 and the ocean plate 2 was considered in order to increase the thickness of the unit. Doing so would, however, raise the manufacturing cost of the dam 100 because a float horizontal column 4, shaft horizontal column 3, and vertical column 5 having such large cross-sections would be very expensive, because such big sire lumber for obtaining such big size columns 3, 4, 5 is rare and very expensive. Conversely, configuring the unit 50a of the dam 100 such that a plurality of separate units 50 are stacked makes it possible to use a float horizontal column 4, shaft horizontal column 3, and vertical column 5 having small cross-sections even when a single separate unit 50 is thin. Therefore, the cost of producing a single separate unit 50 is reduced, and even with a unit 50a in which separate units 50a are stacked, the manufacturing cost of each of the dams 100 is reduced.

Figure 5:
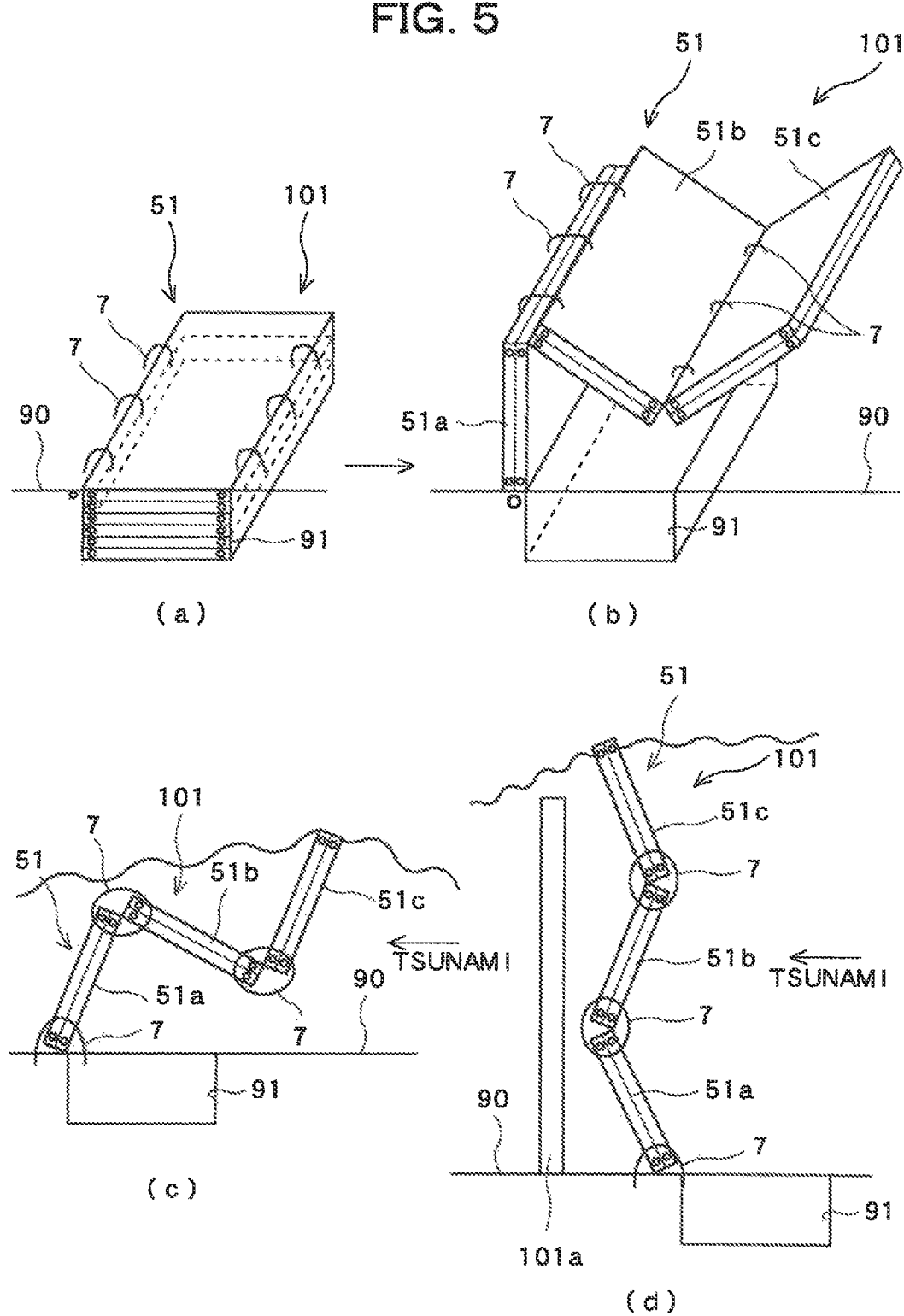
FIG. 5 is a diagram showing a movable tsunami buffer dam 101 according to a second embodiment of the present invention.

A second embodiment of the present invention is described next. FIG. 5 is a diagram showing a buffer dam 101 according to the present embodiment. In the buffer dam 101 of the present embodiment, three levels of units 51a, 51b, 51c are coupled by a ring-shaped wire 7, as shown in FIG. 5. Each of the units 51a, 51b, 51c is configured such that a plurality of the separate units 50 shown in FIG. 2 is stacked as shown in FIG. 1. In the present embodiment, a rectangular pit 91 is dug into a land ground surface 90 near a shoreline, and the three units 51a, 51b, 51c are stored within the pit 91 in a folded state. One end part of the unit 51a is rotatably locked to the ground surface 90 by a hinge 7. Additionally, one end part of the unit 51b is rotatably locked to the unit 51a by a hinge 7, and one end part of the unit 51c is rotatably locked to the unit 51b by a hinge 7.

The operation of the present embodiment is described next. The buffer dam 101 comprising the three levels of the unit 51 (51a, 51b, 51c) stored within the pit 91 in a folded state, as shown in FIG. 5(a). When a tsunami surges, the unit 51 is automatically pulled out of the pit 91 by the force of the tsunami and the buoyancy of the unit 51, the unit floating in the seawater from the tsunami, as shown in FIG. 5(c). The power of the tsunami is reduced due to the loss of energy caused by impacting the units and energy for imparting buoyancy to the unit 51. Furthermore, when the height of the tsunami increases, the three levels of the unit 51 substantially rise up, as shown in FIG. 5(d), thus reducing the power of even a tall tsunami. In the present embodiment, the three levels of the unit 51 are coupled so as to be capable of folding and expanding in the manner of a folding screen; therefore, it is possible to increase the height up to which a tsunami can be buffered. At this time, seawater from the tsunami can be taken into the interior of the multileveled unit 51. Therefore, the units, which are weighted down by the taken-in seawater, are raised up to the tsunami, thereby making it possible to make use of the units to correspondingly reduce the power of the tsunami. A support column 101a is provided upright rearward from (on the land side of) the dam 101, as shown in FIG. 5(d), whereby the unit 51 can be configured to be supported by the support column 101a so that the unit 51 does not collapse on the land side due to the force of the tsunami being too great.

A third embodiment of the present invention is described next. FIG. 6 is a diagram showing a buffer dam 102 according to a third embodiment of the present invention. FIG. 6(a) is a diagram showing the situation of the buffer dam 102 of the present embodiment at a normal time (in a state in which there are no tsunamis), FIG. 6(b) ins a diagram showing a situation of low flooding while a tsunami is surging, and FIG. 6(c) is a diagram showing a situation of high flooding with a large tsunami. The buffer dam 102 is configured from a pole 92 buried in the ground surface 90 such that the axial direction of the pole 92 is parallel to the ground surface 90, a rectangular-columnar first-level unit 52a provided upright above the pole 92 such that the axial direction of the first-level unit 52a is perpendicular to the ground surface 90, a rectangular-columnar second-level unit 52b inserted coaxially within the first-level unit 52a, and a third-level unit 52c of rectangular cross-section that is inserted coaxially within the second-level unit 52b, as shown in (FIG. 6(c)). A pole 93a is secured within the lower end part of the second-level unit 52b, and a pole 93b is secured within the lower-end part of the third-level unit 52c. The second-level unit 52b is capable of moving upward and downward within the first-level unit 52a, and the third-level unit 52c is capable of moving upward and downward within the second-level unit 52b. The pole 92 and the pole 93a are locked by a wire 8 so that the pole 93a does not move further upward than the upper end part of the unit 52a, and the pole 93b and the pole 93a are locked by a wire 8 so that the pole 93b does not move further upward than the upper end part of the unit 52b.

In the present embodiment, the third-level unit 52c, which is disposed in the central part, is configured such that a plurality of the separate units 50 shown in FIG. 2 is stacked as shown by the unit 50a in FIG. 1. The rectangular-columnar first-level unit 52a and second-level unit 52b can also be configured such that the side walls that constitute the four sides of the rectangular columns are configured from the stacked separate units 50 shown in FIG. 1. Thus, the third-level unit 52c, and also the side walls of the first-level unit 52a and second-level unit 52b as necessary, are configured from the stacked separate units 50 shown. FIG. 1, thereby making it possible to improve the strength of the dam 102 at low cost. The first-level unit 52a and second-level unit 52b are not necessarily [limited to] having a rectangular-columnar shape, but rather may be configured as any structure in which two plates are disposed parallel to each other. In this case, some of these parallel-disposed plates can be configured as a unit 50a comprising the stacked separate units 50 shown in FIG. 1.

In the present embodiment, at normal times when there are no tsunamis, both of the units 52c, 52b are accommodated within the unit 52a, as shown in FIG. 6(a). Therefore, at normal times, only a portion of the first-level unit 52a is exposed above the ground surface 90. When a tsunami strikes, seawater advances into the first-level unit 52a, and the second-level unit 52b and third-level unit 52c float and move upward, as shown in FIG. 6(b). Furthermore, when the height of the tsunami increases, the third-level unit 52c and second-level unit 52b are further elevated, until finally the third-level unit 52c is exposed from the second-level unit 52b and the second-level unit 52b is exposed from the first-level unit 52a, as shown in FIG. 6(c). Thus, a buffer dam 102 that has a height equal to the total height of the three levels of units is obtained. The units 52b, 52c of each of the levels are configured with the wires 8 so as not to be detached from the lower units 52a, 52b. Therefore, even if the height of the tsunami increases further, the perpendicular orientation of the dam 102 does not break. When the dam 102 is configured in this multilevel-stored type, the installation space therefor is reduced.

Figure 7:
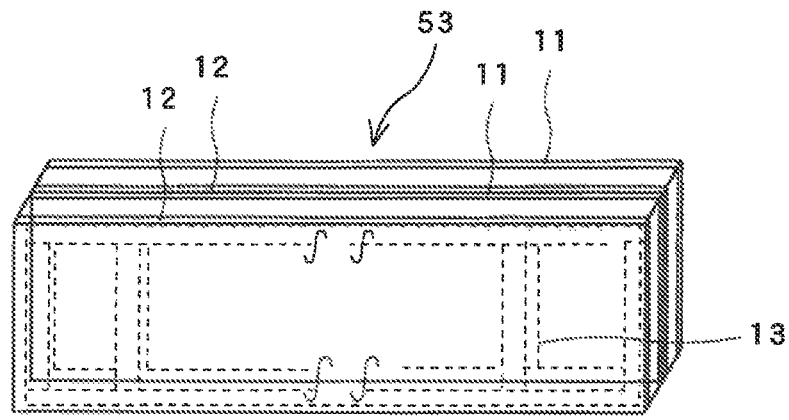
FIG. 7 is a perspective view of a wave-blocking-gate unit 53 of a movable tsunami buffer dam 103 according to a fourth embodiment of the present invention.
Figure 8:
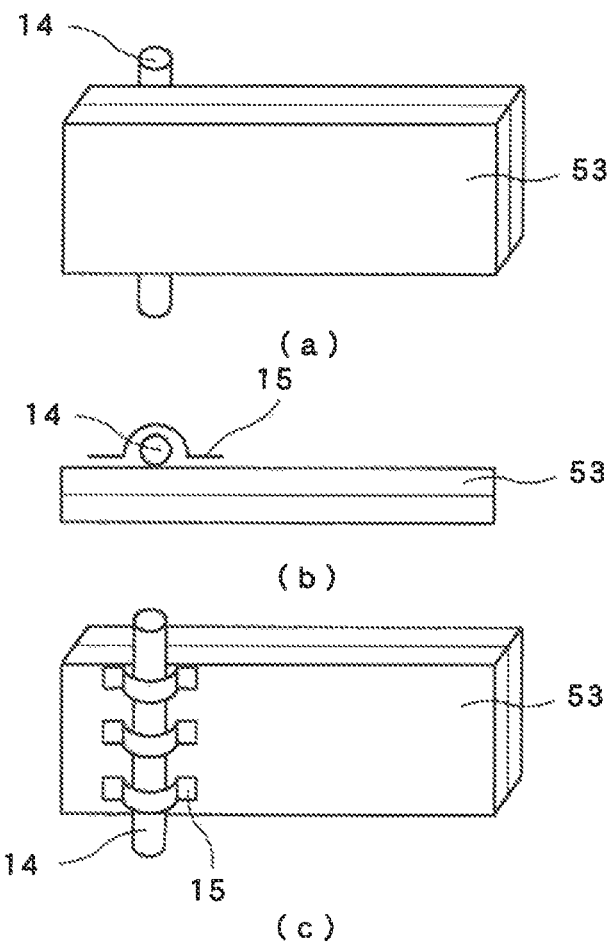
FIG. 8 is a perspective view of the same wave-blocking-gate unit 53.
Figure 9:
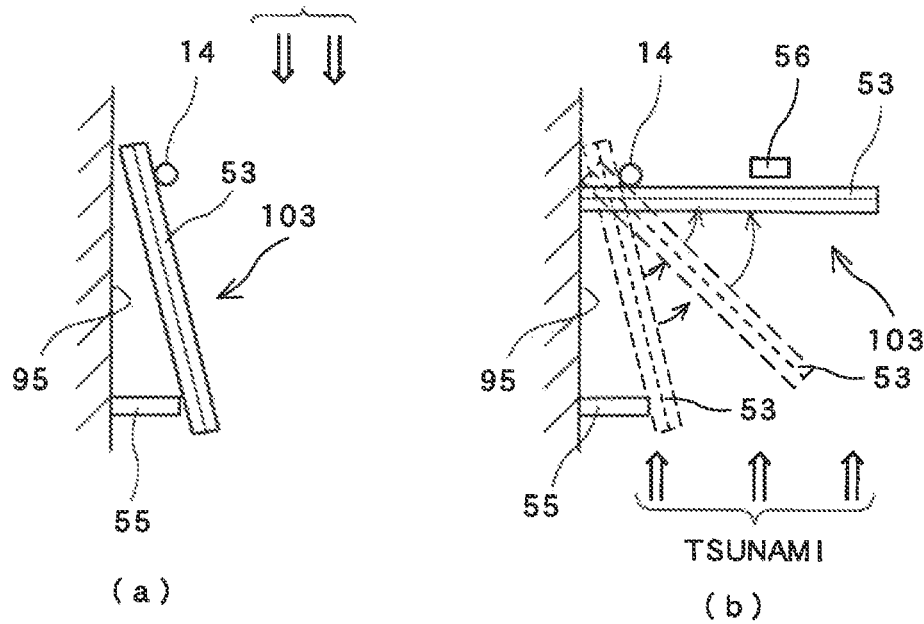
FIG. 9 is a plan view of the operation of the same wave-blocking-gate unit 53.

A fourth embodiment of the present invention is described next. The present embodiment relates to a buffer dam configured as a movable tsunami buffer gate (wave-blocking gate). FIGS. 7-10 show a buffer dam 103 according to the fourth embodiment of the present invention and a unit 53 that constitutes part of the buffer dam 103. The unit 53 has two wave-blocking-gate plates 11, 12 disposed parallel to each other, the wave-blocking-gate plates 11, 12 sandwich a wave-blocking-gate frame 13 therebetween, and the unit 53 forms a plate shape configured as a wave-blocking-gate door, as shown in FIG. 7, the unit 53 being formed from wood or another light material. The unit 53, similarly to the unit shown in FIG. 1, is configured such that two-layered structures or three or more layers are stacked. The wave-blocking-gate frame 13 forms a space between the wave-blocking-gate plates 11, 12, and improves the strength of the unit 53 as a wave-blocking-gate door. A wave-blocking-gate shaft column 14 is coupled by a hinge 15 to one surface of the unit 53 that is a wave-blocking-gate door. The wave-blocking-gate shaft column 14 is provided upright near a riverbank or pier 95, as shown in FIG. 9(a). Therefore, the wave-blocking-gate door unit 53 rotates about the wave-blocking-gate shaft column 14 using the hinge 15. An open stopper 55 is provided upright to the river bottom near the distal end part of the wave-blocking gate column 14, the distal end of the wave-blocking-gate door unit 53 abutting on the open stopper 55 and being configured to be held in an opened state with respect to the direction in which a tsunami arrives. The wave-blocking-gate door unit 53 thereby remains, at normal times, in the opened state with respect to the direction in which a tsunami arrives so that the wave-blocking-gate door unit 53 will not lie over the riverbank or pier 95; therefore, when a tsunami arrives, the wave-blocking-gate door 53 rotates about the wave-blocking-gate shaft column 14 due to the power of the tsunami and opens so as to hold back the tsunami, as shown in FIG. 9(b). In this case, it is preferable that a close stopper 56 be installed at a position at which the wave-blocking-gate door separate unit 50 will abut on the close stopper 56 when the wave-blocking-gate door unit 53 has opened so as to be substantially perpendicular to the riverbank or pier 95. The wave-blocking-gate door unit 53 thereby acts so as to hold back the tsunami, reducing the power of the tsunami.

In the present embodiment as well, the buffer dam 103 reduces the power of a tsunami and functions as a tsunami buffer dam. Additionally, a space into which the seawater advances is present in the interior of the unit 53, and therefore seawater can be taken into the space, thereby imparting buoyancy to the unit 53, adding to the weight of the unit 53 due to seawater, and contributing to the weakening of the power of the tsunami.

Figure 10:
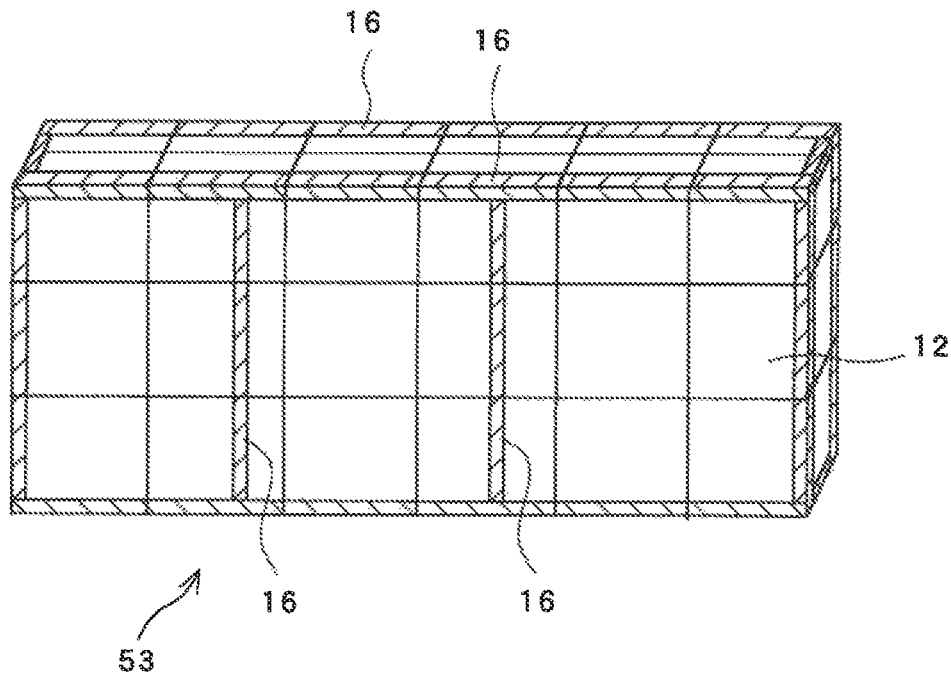
FIG. 10 is a perspective view of a modification of the same wave-blocking-gate unit for large scale.

In order to function as a tide embankment, the unit 53 needs to expand in a direction realizing the function as a buffer dam against tsunamis, but the strength afforded by solely using light materials merely ensures a width of approximately 10 m. However, disposing steel frames 16 on the edges of the unit 53 forming a cuboid, and furthermore disposing steel frames 16 for linking the edges across the long edges, as shown in FIG. 10, makes it possible to enlarge the unit 53. Reinforcement by such steel materials enables an expansion of the width of the unit 53 up to, e.g., 20-70 m.

A height of approximately 4-6 m is a baseline for the height of the unit 53, but it is preferable to determine the height, etc., such that suitable portions of the height of the gate door (e.g., half or more of the height of the gate door unit 53) are submerged in the water. This makes it possible for the weight of the entire gate door to be efficiently supported by a portion of the hinge 15, and for the unit 53 to readily move as a gate door, when the gate door is made to float. The shaft column 14 may be made of wood, provided that the wood is sturdy, and is provided upright near the riverbank or in the water in the river. The shaft column 14 and the gate door unit 53 are coupled by the hinge 15, which has a ring belt shape or other similar shape. The gate door unit 53 is installed perpendicular so that, when the river is flowing, the gate door unit 53 is disposed substantially along the flow, the gate door unit 53 being configured so as not to pose a hindrance to the normal current. The open stopper 55 is installed, and the gate door unit 53 enters a slightly opened state away from the riverbank or pier 95 by the open stopper 55, so as to receive a tsunami traveling upstream from the ocean side. Thus, when a tsunami starts traveling upstream from the ocean side, the gate door unit 53 expands in a direction realizing the function as a dam due to the force of the large water mass from the tsunami moving from the ocean side toward the land side, the gate door moving so as to close, and supported by the close stopper 56, the gate door unit 53 stops at a position so as to be perpendicular to the direction of flow of the tsunami, thereby functioning as a breakwater. The close stopper 56 is installed in the water so that the gate door unit 53 can maintain the most effective position as a dam. Alternatively, the gate door unit 53 may be made to function as a breakwater by being pulled from the ocean side by a wire.

Providing a gap between the lower part of the gate door unit 53 and the river bottom makes it possible for the gate door 53 to move smoothly to a position for exhibiting the function of a dam. In the position where the gate door unit 53 functions as a dam, it is allowable for the tsunami to advance from the gap toward the land; the gate door unit 53 is capable of holding back most subsequent tsunamis, making a great contribution to reducing the power of tsunamis. The height of the gate door unit 53 as a tsunami buffer dam cannot be adequately increased, but installing the gate door unit 53 in the position closest to the ocean makes it possible to adequately prevent the passage of tsunamis that are not particularly high at the surface of the gate door unit 53 that faces the tsunamis, therefore making it possible to anticipate a large tsunami buffer effect.

Partially allowing the advance of the tsunami from the gap between the gate door unit 53 and the river bottom basically places the gate door unit 53 in a state of floating in the water. Therefore, the gate door unit 53 may be of any configuration, provided that the gate door unit 53 has a level of strength corresponding to that situation.

When there is a wide range in which the gate door unit 53 must be made to function as a dam, it is necessary for the width of the gate door unit 53 to be increased and for the gate door unit 53 to be supported by a steel frame 16, etc. Making these changes increases the overall weight of the gate door unit 53, which makes manufacturing and installation operations more difficult. In such cases, it is possible to manufacture a gate-door-shaped unit 53 as a whole by providing a reinforcing steel frame 16 as an outer frame for the gate door structure and inserting a plurality of structures that are made of a light material and that are divided in block shapes into the interior of the frame.

As described above, the two wave-blocking-gate plates 11, 12 are made of a light material, the wave-blocking-gate door unit 53 being configured by sandwiching a wave-blocking-gate frame 13 between the wave-blocking-gate plates 11, 12. The wave-blocking-gate unit 53 exhibits a breakwater effect when closed. The wave-blocking-gate frame 13 has the same width and height as the wave-blocking-gate plates 11, 12, and is made of a light material. The wave-blocking-gate frame 13 increases the strength of the wave-blocking-gate unit 53, and forms a space in the interior of the wave-blocking-gate unit 53, seawater being taken into the space, thereby increasing the weight of the gate door unit 53 and reducing the power of a tsunami. The wave-blocking-gate shaft column 14 is a support column forming a shaft about which the wave-blocking-gate door unit 53 opens and closes, and is provided upright in the water. When a tsunami surges, the wave-blocking-gate shaft column 14 also fulfills the purpose of supporting the wave-blocking-gate door unit 53 from the rear. The hinge 15 couples the wave-blocking-gate door unit 53 and the wave-blocking-gate shaft column 14 so that the wave-blocking-gate door unit 53 moves in the river-width direction in a prescribed state. Specifically, hinges 15 are provided in multiple positions (e.g., six or more locations) so as to wrap around the shaft column 14 in a semicircular shape, the hinges 15 stabilizing the gate door unit 53 and allowing the same to rotate. The open stopper 55 keeps the gate door unit 53 in an open state in relation to the flow (current from upstream to downstream) of the river at normal times; when a tsunami surges, the open stopper 55 functions as a spacer for ensuring that there is an opening to receive and take in the tsunami between the wave-blocking-gate door unit 53 and the riverbank or pier 95. When the wave-blocking-gate door unit 53 has moved in a direction to close off the river and expanded to the maximum length in the river-width direction, the close stopper 56 has a function for stopping the wave-blocking-gate door unit 53 from moving so that the wave-blocking-gate door unit 53 can be retained at that location.

Figure 11:
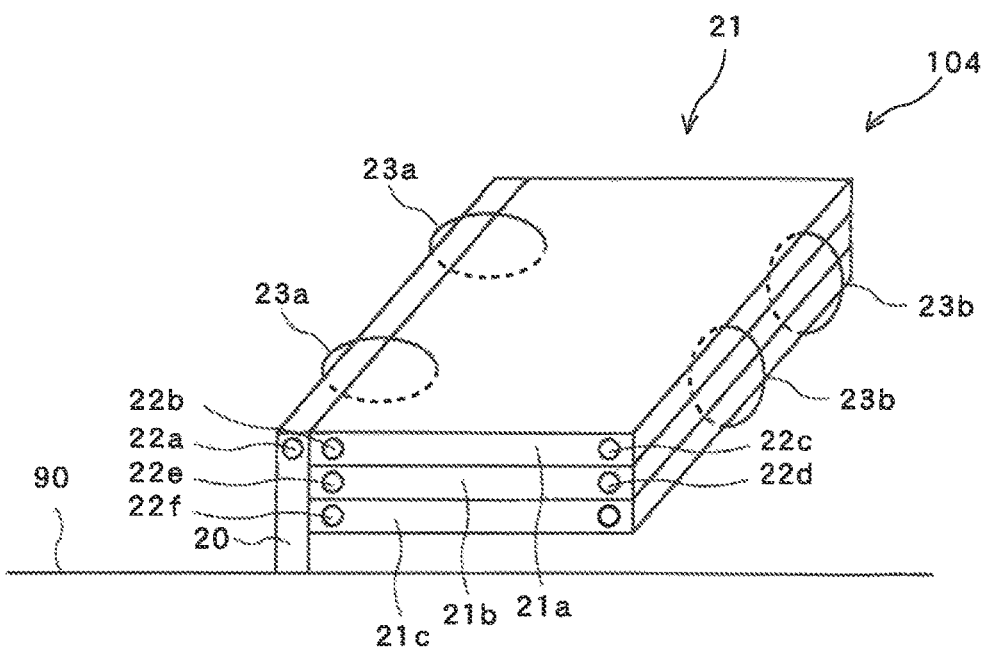
FIG. 11 is a perspective view of a movable tsunami buffer dam 104 according to a fifth embodiment of the present invention.

A fifth embodiment of the present invention is described next. FIG. 11 is a diagram showing a tsunami buffer dam 104 according to the fifth embodiment of the present invention. The buffer dam 104 is provided with a unit 21 (21a, 21b, 21c) configured such that units having a structure similar to that of the separate unit 50 shown in FIG. 2 are stacked as shown in FIG. 1. Two pole-shaped columns 22b, 22c, 22d, 22e, 22f extending in the width direction are installed at one or both longitudinal-direction end parts of the unit 21, in the interior of the units 21a, 21b, 21c. A plate-shaped wave-blocking wall 20 is secured so as to be perpendicular to the ground surface 90 that is the installation surface of the dam 104, and a round-pole column 22a is installed in the interior of the upper end of the wave-blocking wall 20 so as to extend in the width direction of the unit 21. The wave-blocking wall 20 and the unit 21 (21a, 21b, 21c) are separate members that are isolated from each other, but the wave-blocking wall 20 and the unit 21a are coupled due to two columns 22a, 22b being locked by two ring-shaped wires 23a. The unit 21a and the unit 21b are coupled due to two columns 22c, 22d being locked by two ring-shaped wires 23b. The unit 21b and the unit 21c are coupled due to two columns 22e, 22f being locked by two endless wires (not shown).

In the present embodiment, when a tsunami arrives, the three levels of units 21c, 21b, 21a rise up due to the force of the tsunami and are blown upward by the buoyancy of the seawater, in a manner similar to that shown in FIG. 5. The unit 21 (21a, 21b, 21c) operates as a buffer dam against the tsunami, in a manner similar to that shown in FIG. 5(d). In the present embodiment, the wave-blocking wall 20 is provided upright to the ground surface 90 and secured, and the unit 21a on the lowermost level of the unit 21 floating due to the tsunami is coupled to the upper end of the wave-blocking wall 20 by the wires 23a. Therefore, the tsunami buffer dam formed by the wave-blocking wall 20 and the three levels of the unit 21 can be made remarkably taller than the buffer dam shown in FIG. 5. Additionally, in the present embodiment, the dam 104 (unit 21) is not stored within a pit 91, but rather is disposed on the ground surface 90 and coupled to the wave-blocking wall 20 secured to the ground surface 90, the dam 104 being retained in a prescribed position so as not to move inadvertently. Therefore, at normal times when no tsunamis have arrived, the dam 104 functions as an embankment provided to the shoreline. Specifically, the unit 21 is installed so as to be stacked on the ocean side of the wave-blocking wall 20, and when a tsunami arrives, the unit 21 rises up due to the force of the tsunami, but in normal times, the unit 21 functions as an embankment having the height of the stacked unit 21.

Figure 12:
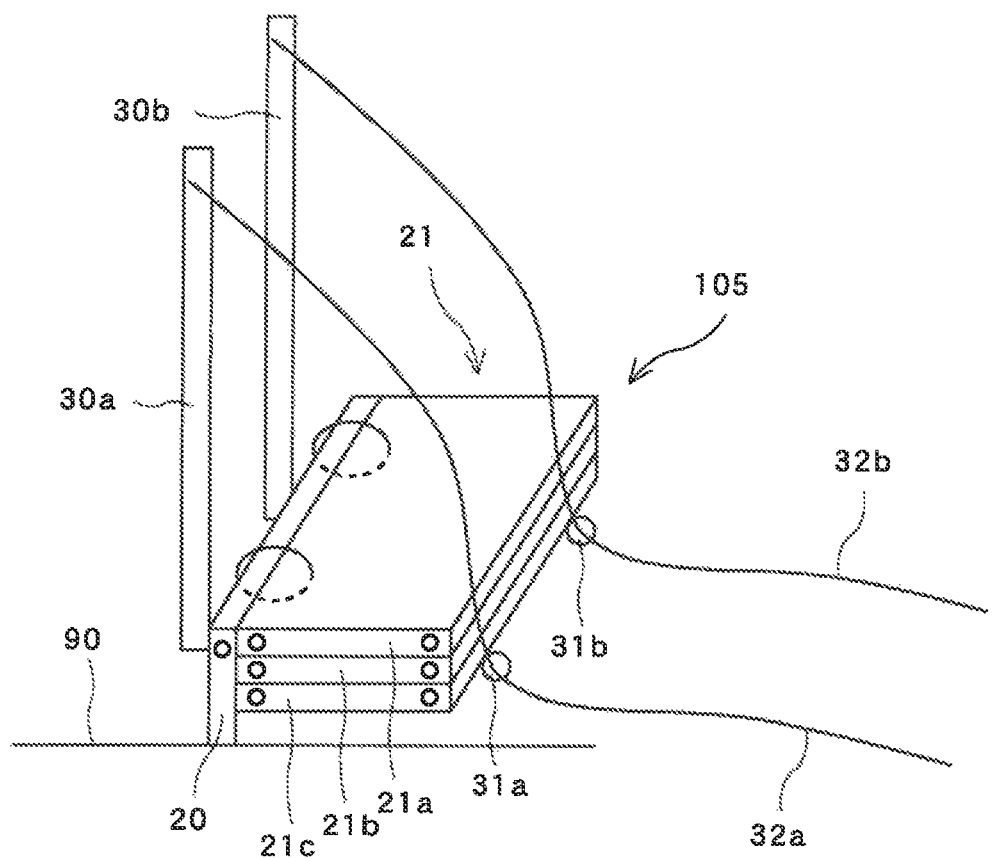
FIG. 12 is a perspective view of a movable tsunami buffer dam 105 according to a sixth embodiment of the present invention.

A sixth embodiment of the present embodiment is described next. FIG. 12 is a diagram showing a tsunami buffer dam 105 according to the sixth embodiment of the present invention. The buffer dam 105 has members configured in the same manner as the unit 21 and wave-blocking wall 20 that constitute part of the buffer dam 104 shown in FIG. 11. The buffer dam 105 furthermore has two support columns 30a, 30b provided upright to the rear (landward position) of the wave-blocking wall 20, and guide rings 31a, 31b provided to the ocean-side side surface of the unit 21c stacked on the lowest layer of the unit 21. One end each of guide wires 32a, 32b is secured to the upper end of the support columns 30a, 30b, respectively, and the other ends of the guide wires 32a, 32b are passed through the guide rings 31a, 31b, respectively.

In the tsunami buffer 105 of the present embodiment configured in this manner, the unit 21 floats due to the force of the tsunami and buoyancy in the same manner as in FIG. 5(d), and when the dam 105 rises up, the guide wires 32a, 32b pass through the guide rings 31a, 31b at the upper end part of the unit 21c forming the uppermost level. Therefore, the unit 21c receives a fixed binding force due to the guide wires 32a, 32b, thus resisting the force of the tsunami and maintaining a fixed position in the seawater. Therefore, the dam 105, which comprises a four-level structure comprising the wave-blocking wall 20 and the units 21a, 21b, 21c, is capable of reducing the force of the tsunami and effectively buffering the tsunami.

A seventh embodiment of the present invention is described below with reference to FIG. 13. A buffer dam 106 of the present embodiment has a wave-blocking wall 24 having basically the same structure as the wave-blocking wall 20, and a unit 25 (units 25a, 25b, 25c) having basically the same structure as the unit 21. The wave-blocking wall 24 and the unit 25a are coupled by a ring-shaped wire 27a, the unit 25a and the unit 25b are coupled by a ring-shaped wire 27b, and the unit 25b and the unit 25c are similarly coupled by a ring-shaped wire (not shown). However, the unit 25a-side corner part of the upper end of the wave-blocking wall 24 is cut away to form a recessed section 26a. The wave-blocking wall 24-side upper corner part and the ocean-side lower corner part of the unit 25a are also cut away to form recessed section 26b, 26c, respectively. Similarly, the wave-blocking wall 24-side upper corner part and the ocean-side lower corner part of the unit 25b are also cut away to form recessed sections 26e, 26d, respectively. Furthermore, the wave-blocking wall 24-side upper corner part of the unit 25c is also cut away to form a recessed section 26f.

Figure 13:
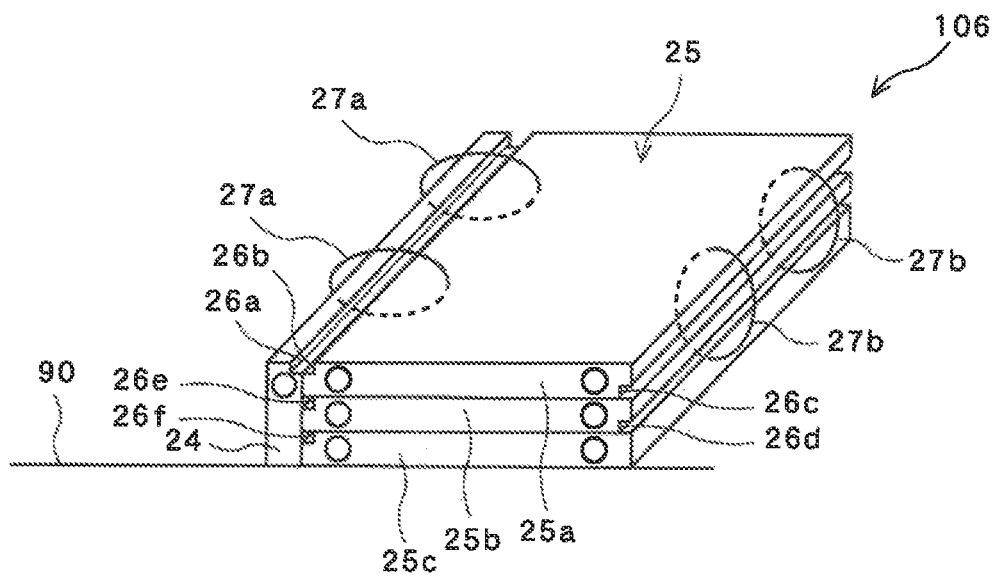
FIG. 13 is a perspective view of a movable tsunami buffer dam 106 according to a seventh embodiment of the present invention.

In the tsunami buffer dam 106 of the present embodiment configured in this manner, when a tsunami arrives, the units 25a, 25b, 25c float by the steps shown in FIG. 5 in the same manner as in FIG. 13, and the unit 25c stacked on the is lowermost layer floats to the highest position in the seawater. Then, when the tsunami recedes, the units 25c-25a collapse on the ocean side of the wave-blocking wall 24. If the units 25c-25a collapse on the land side of the wave-blocking wall 24 when the tsunami ecedes, however, the units 25c-25a cannot return to the ocean side of the wave-blocking wall 24, making it impossible for the dam 106 to function as a tsunami buffer dam when the next tsunami arrives.

Figure 14:
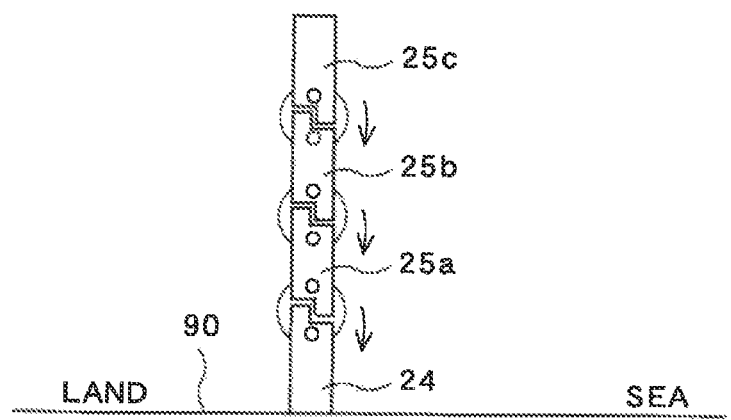
FIG. 14 is a diagram showing the operation of the same.

In the present embodiment, however, when the unit 25 has risen up, the recessed section 26b of the unit 25a forming the lowermost level when floating catches on the recessed section 26a of the wave-blocking wall 24, the recessed section 26d of the unit 25b forming the middle level when floating catches on the recessed section 26c of the unit 25a, and the recessed section 26f of the unit 25c forming the uppermost level catches on the recessed section 26e of the unit 25b, as shown in FIG. 14. Thus, the recessed sections 26a-26f latch onto each other, and the units 25a-25c are prevented from collapsing on the land side, instead collapsing on the ocean side when the tsunami recedes. Specifically, in FIG. 14, due to the shapes of the recessed sections 26a-26f, e.g., the unit 25c cannot rotate in the counterclockwise direction shown in the drawing with relation to the unit 25b, and can rotate only in the clockwise direction. Therefore, when the tsunami recedes, the unit 25c on the uppermost level, having lost buoyancy, collapses in the clockwise direction, and in sequence the unit 25b on the middle level and the unit 25a on the lower level collapse in the clockwise direction, the units 25 being lay down on a sea-side ground.

In the present embodiment, in cases where a tsunami arrives in a plurality of sequential waves, after the first tsunami waves arrives and then recedes, all of the units 25a 25b, 25c lie on the ground on the ocean side of the wave-blocking wall 24, because of the recessed sections 26a-26f. Therefore, according to the present embodiment, if the second successive waves of tsunami arrives, the units 25c and 25b can smoothly move so as to float upward and, accordingly, the unit 25a is also move upwardly.

What is claimed is:

1. A movable tsunami buffer dam, comprising:
A unit configured such that a plurality of separate units, each of which having a shape in which a frame including a light material is sandwiched by a pair of plates including a light material, is stacked with said plates disposed in a pile; and
A locking member for locking said unit to a ground surface such that said unit is configured to rise up from said ground surface and collapse onto said ground surface,
Said separate units including a structure in which water from a tsunami is configured to advance into a space formed between said plates by said frame,
A required thickness being ensured due to said unit being configured such that said separate units are stacked, and a manufacturing cost being reduced to a greater extent than in a case of a dam configured from a single separate unit of said required thickness, and
Said unit being installed in a state of being collapsed on said ground surface at normal times, and when the tsunami arrives, said unit rising up due to a force of the tsunami and a buoyancy of seawater, resisting a passage of the tsunami and reducing a power of the tsunami;
Wherein the pair of plates and the space are arranged in parallel.

2. The movable tsunami buffer dam according to claim 1, wherein the pair of plates are spaced apart in parallel from each other to provide the space between the pair of plates.

3. The movable tsunami buffer dam according to claim 1, wherein, when the tsunami arrives, the unit automatically rises up by the force of the tsunami or the buoyancy in the seawater to dissipate the force of the tsunami.

4. A movable tsunami buffer dam, comprising:
A plurality of units configured such that a plurality of separate units, each of which having a shape in which a frame including a light material is sandwiched by a pair of plates including a light material, is stacked with said plates disposed in a pile; and
A locking member for locking said plurality of units to each other to link said units into a chain, and locking a unit of said plurality of units on a lowermost level to a ground surface, such that said plurality of units is configured to rise up from said ground surface and collapse onto said ground surface;

Said separate units having including a structure in which water from a tsunami is configured to advance into a space formed between said plates by said frame, A required thickness being ensured due to said units being configured such that said separate units are stacked, and a manufacturing cost being reduced to a greater extent than in a case of a dam configured from a single separate unit of said required thickness, and Said plurality of units being installed in a state of being folded on said ground surface at normal times, and when the tsunami arrives, said plurality of units rising up so as to form multiple levels due to a force of the tsunami and a buoyancy of seawater, and said multi-level units resisting a passage of the tsunami and reducing a power of the tsunami;

Wherein the pair of plates and the space are arranged in parallel.

5. The movable tsunami buffer dam according to claim 4, wherein, when the tsunami arrives, the plurality of units automatically rise up to form the multiple levels due to the force of the tsunami and the buoyancy of the seawater to obstruct the tsunami.

6. A movable tsunami buffer dam, comprising:

A unit forming a wave-blocking gate, said unit being configured such that a plurality of separate units, each of which having a shape in which a frame including a light material is sandwiched by a pair of plates including a light material, is stacked with said plates disposed in a pile;

A wave-blocking-date shaft column that is rotatably attached to a rear surface of said unit and that is provided upright to a bottom surface of a river, said wave-blocking-gate shaft column supporting said unit such that said unit is configured to open and close as a wave-blocking gate for holding back said river;

An open stopper abutting a distal end part of said unit, and opening a gap between said distal end part of said unit and a riverbank or a pier; and A close stopper against which said unit abuts when said unit rotates to a position for closing as a wave-blocking gate, said close stopper preventing said unit from rotating further, Said separate units including a structure in which water from a tsunami is configured to advance into a space formed, by said frame, between said plates, A required thickness being ensured due to said unit being configured such that said separate units are stacked, and a manufacturing cost being reduced to a greater extent than in a case of a dam configured from a single separate unit of said required thickness, and Said unit abutting said open stopper due to a flow of said river at normal times, and when the tsunami arrives, said unit rotating and abutting said close stopper, resisting a passage of the tsunami and reducing a power of the tsunami;

Wherein the pair of plates and the space are arranged in parallel.

7. The movable tsunami buffer dam according to claim 6, wherein the wave-blocking-gate shaft column rotatably supports said unit such that, when the tsunami arrives, said wave-blocking-gate shaft column holds back the tsunami.

8. A movable tsunami buffer dam, comprising:

A plurality of units, each of which having a shape in which a frame including a light material is sandwiched by a pair of plates including a light material;

A wave-blocking wall provided upright to a ground surface; and

A locking member for locking said plurality of units to each other to link said units into a chain, and locking a unit of said plurality of units on a lowermost level to said ground surface, such that said plurality of units is configured to rise up from said ground surface and collapse onto said ground surface;

Said separate units including a structure in which water from a tsunami is configured to advance into a space formed by said frame, between said plates, and Said plurality of units being installed in a state of being folded on said ground surface at normal times, and when the tsunami arrives, said plurality of units rising up so as to form multiple levels due to a force of the tsunami and a buoyancy of seawater, said multilevel units that have risen up and said wave-blocking wall resisting a passage of the tsunami and reducing a power of the tsunami;

Wherein the pair of plates and the space are arranged in parallel.

9. The movable tsunami buffer dam according to claim 8, wherein the plurality of units folded at the normal times is linked into the chain by the locking member, and the unit on the lowermost level when the units have risen up is linked to said wave-blocking wall.

10. A movable tsunami buffer dam, comprising:

A plurality of units, each of which having a shape in which a frame including a light material is sandwiched by a pair of plates including a light material;

A wave-blocking wall provided upright to a ground surface;

A locking member for locking said plurality of units to each other to link said units into a chain, and locking a unit of said plurality of units on a lowermost level to said wave-blocking wall, such that said plurality of units is configured to rise up from said ground surface and collapse onto said ground surface;

A ring for a guide wire, said ring being provided to a side surface of a unit of said plurality of units forming an uppermost level when said plurality of units rises up;

A support column provided upright to a rear of said wave-blocking wall; and

A guide wire of which one end is secured to said support column and of which another end is passed through said ring for a guide wire, Said units including a structure in which water from a tsunami is configured to advance into a space formed between said plates by said frame;

Said plurality of units being installed in a state of being folded on said ground surface at normal times, and When the tsunami arrives, said plurality of units rising up so as to form multiple levels due to a force of the tsunami and a buoyancy of seawater, and in a state in which a movement of the unit on the uppermost level is constrained by said guide wire, said multilevel units that have risen up and said wave-blocking wall resisting a passage of the tsunami and reducing a power of the tsunami;

Wherein the pair of plates and the space are arranged in parallel.

11. The movable tsunami buffer dam according to claim 10, wherein the guide wire is fixed to said support column through said ring, such that the plurality of units rises up due to the force of the tsunami and the buoyancy of the seawater to confront the tsunami in an aligned state.

12. A movable tsunami buffer dam, comprising:

A plurality of units, each of which having a shape in which a frame including a light material is sandwiched by a pair of plates including a light material;

A wave-blocking wall provided upright to a ground surface;

A lacking member for locking said plurality of units to each other to link said units into a chain, and locking a unit of said plurality of units on a lowermost level to said wave-blocking wall, such that said plurality of units is configured to rise up from said ground surface and collapse onto said ground surface; and Recessed sections by which said wave-blocking wall and locking-member-side end parts of said units are locked, Said units having including a structure in which water from a tsunami is configured to advance into a space formed between said plates by said frame, Said plurality of units being installed in a state of being folded on said ground surface at normal times, and when the tsunami arrives, said plurality of units rising up so as to form multiple levels due to a force of the tsunami and a buoyancy of seawater, In a risen-up state, adjacent recessed sections being fitted into each other to prevent contiguous units from rotating in one direction relative to each other, and Said multilevel units that have risen up and said wave-blocking wall resisting a passage of the tsunami and reduce a power of the tsunami;

Wherein the pair of plates and the space are arranged in parallel.

13. The movable tsunami buffer dam according to claim 12, wherein the recessed sections are located in shoulder positions of the wave-blocking wall and the units, and the recessed sections fit with each other to retain the wave-blocking, wall and the units in an upright state.

* * * * *